US012797915B2

(12) United States Patent
Kang

(10) Patent No.: US 12,797,915 B2

(45) Date of Patent: Nov. 17, 2026

(54) APPARATUS FOR AUTOMATICALLY CLEANING SOLAR CELL PANEL AND SOLAR CELL PANEL CLEANING SYSTEM USING SAME

(71) Applicant: GREEN WOOJEON CO., LTD., Seoul (KR)

(72) Inventor: Seung Gu Kang, Seoul (KR)

(73) Assignee: GREEN WOOJEON CO., LTD., Seoul (KR)

( * ) Notice: Subject to any disclaimer, the term of this patent is extended or adjusted under 35 U.S.C. 154(b) by 308 days.

(21) Appl. No.: 18/577,910

(22) PCT Filed: Jul. 6, 2022

(86) PCT No.: PCT/KR2022/009709

§ 371 (c)(1),
(2) Date: Jan. 9, 2024

(87) PCT Pub. No.: WO2023/282599

PCT Pub. Date: Jan. 12, 2023

(65) Prior Publication Data

US 2024/0283399 A1 Aug. 22, 2024

(30) Foreign Application Priority Data

Jul. 9, 2021 (KR) ........................ 10-2021-0090122
Feb. 15, 2022 (KR) ........................ 10-2022-0019428

(51) Int. Cl.
*B08B 3/02* (2006.01)
*B08B 1/12* (2024.01)
(Continued)

(52) U.S. Cl.
CPC ................ *B08B 3/024* (2013.01); *B08B 1/12* (2024.01); *B08B 1/14* (2024.01); *B08B 1/34* (2024.01); *B08B 1/40* (2024.01); *H02S 40/10* (2014.12)

(58) Field of Classification Search
CPC . F24S 40/20; H02S 40/10; B08B 1/14; B08B 1/30; B08B 1/32; B08B 1/40; B08B 3/024
See application file for complete search history.

(56) References Cited

U.S. PATENT DOCUMENTS

2008/0037243 A1* 2/2008 Discoe .................... F21S 9/026 362/183
2011/0179789 A1* 7/2011 Khoramian ............... F03G 6/00 60/641.8

(Continued)

FOREIGN PATENT DOCUMENTS

CN 206611378 U 11/2017
DE 102014001797 A1 8/2015

(Continued)

OTHER PUBLICATIONS

International Search Report issued in International Application No. PCT/KR2022/009709 dated Nov. 2, 2022.

(Continued)

*Primary Examiner* — Joel D Crandall

(74) *Attorney, Agent, or Firm* — MEDLER FERRO WOODHOUSE & MILLS PLLC

(57) ABSTRACT

A solar cell panel cleaning system according to an embodiment of the present invention includes a cleaning unit body configured to remove foreign substances attached to the solar cell panel, a driving force-providing unit configured to move the cleaning unit body, and a controller including a contamination region calculation unit configured to sense a contaminated region of the solar cell panel, and a wireless (Continued)

communication module configured to provide information on the contaminated region to the driving force-providing unit and the cleaning unit body.

11 Claims, 14 Drawing Sheets

(51) Int. Cl.

| | |
|---|---|
| ***B08B 1/14*** | (2024.01) |
| ***B08B 1/34*** | (2024.01) |
| ***B08B 1/40*** | (2024.01) |
| ***H02S 40/10*** | (2014.01) |

(56) References Cited

U.S. PATENT DOCUMENTS

| | | | | |
|---|---|---|---|---|
| 2014/0202492 | A1* | 7/2014 | Grossman | B08B 1/12 15/4 |
| 2017/0057636 | A1 | 3/2017 | Azaiz | |
| 2017/0093330 | A1* | 3/2017 | Castellucci | H02S 20/32 |
| 2018/0241343 | A1 | 8/2018 | Jiang et al. | |
| 2019/0184544 | A1 | 6/2019 | Tadayon | |
| 2020/0336101 | A1* | 10/2020 | Stewart | H02S 40/10 |

FOREIGN PATENT DOCUMENTS

| | | | | |
|---|---|---|---|---|
| DE | 202019005076 | U1 * | 10/2020 | B08B 1/36 |
| JP | 2009199359 | A * | 9/2009 | |
| JP | 2018-069223 | A | 5/2018 | |
| KR | 20100115448 | A | 10/2010 | |
| KR | 101451288 | B1 | 10/2014 | |
| KR | 101579036 | B1 * | 12/2015 | H02S 40/10 |
| KR | 10-1776573 | B1 | 9/2017 | |
| KR | 101822307 | B1 * | 1/2018 | B25J 9/1664 |
| KR | 10-2019-0117927 | A | 10/2019 | |
| KR | 20200038210 | A * | 4/2020 | H02S 50/15 |
| KR | 10-2020-0079762 | A | 7/2020 | |
| KR | 10-2020-0109066 | A | 9/2020 | |
| KR | 10-2373790 | B1 | 3/2022 | |
| WO | 2019215756 | A1 | 11/2019 | |

OTHER PUBLICATIONS

Written Opinion issued in International Application No. PCT/KR2022/009709 dated Nov. 2, 2022.

* cited by examiner

[FIG. 1]
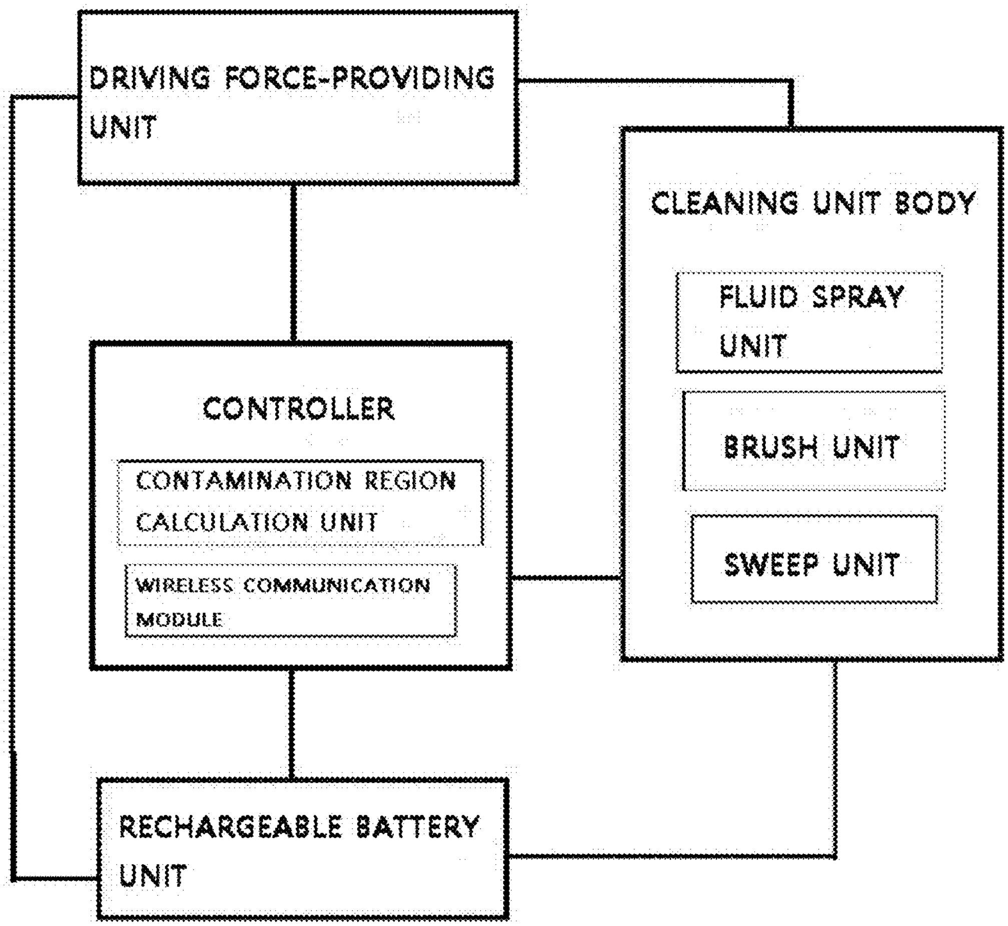

[FIG. 2]
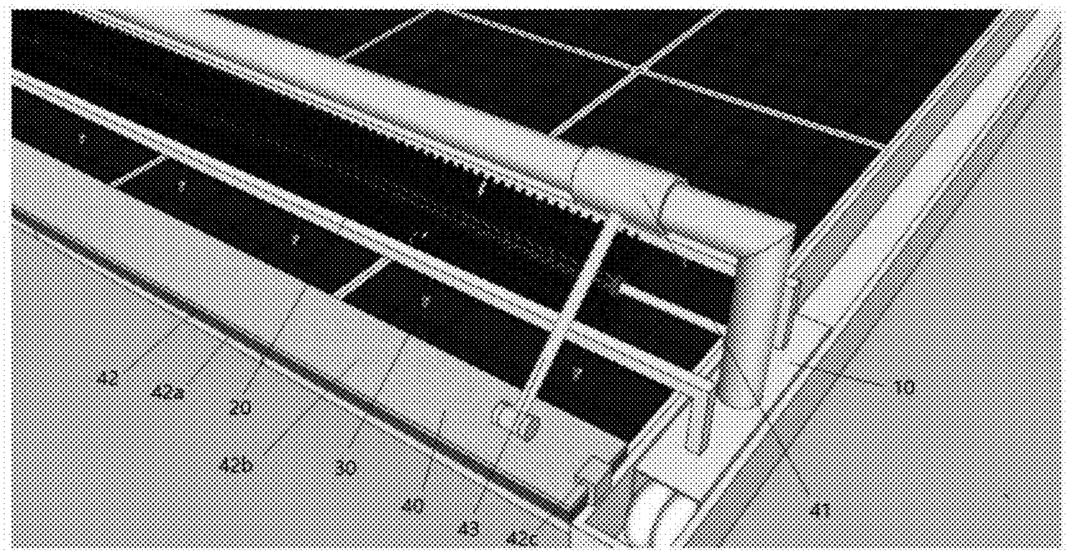
[FIG. 3]
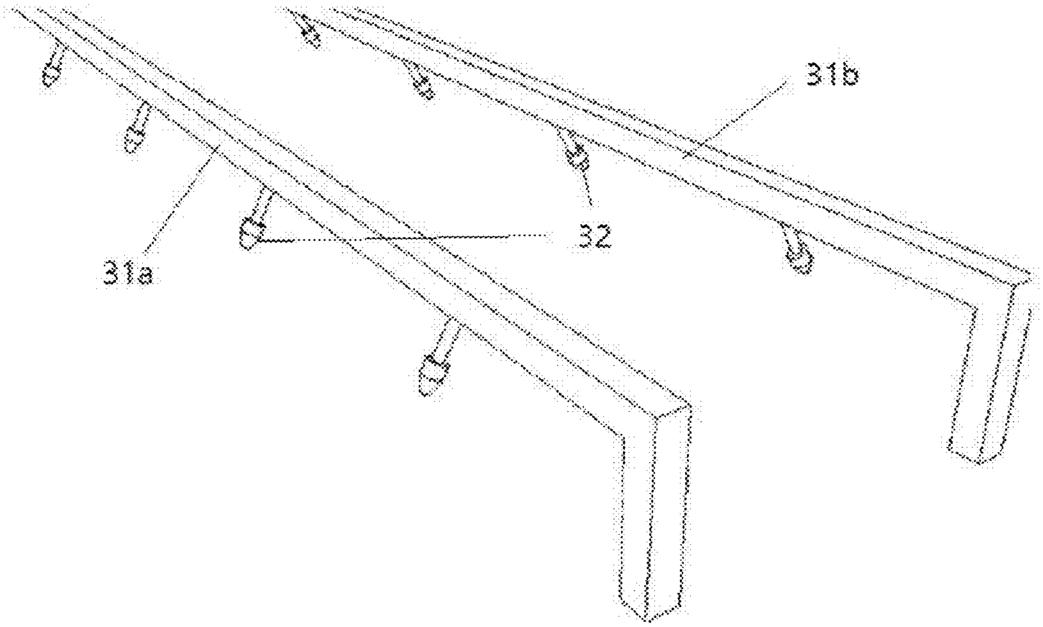

[FIG. 4]
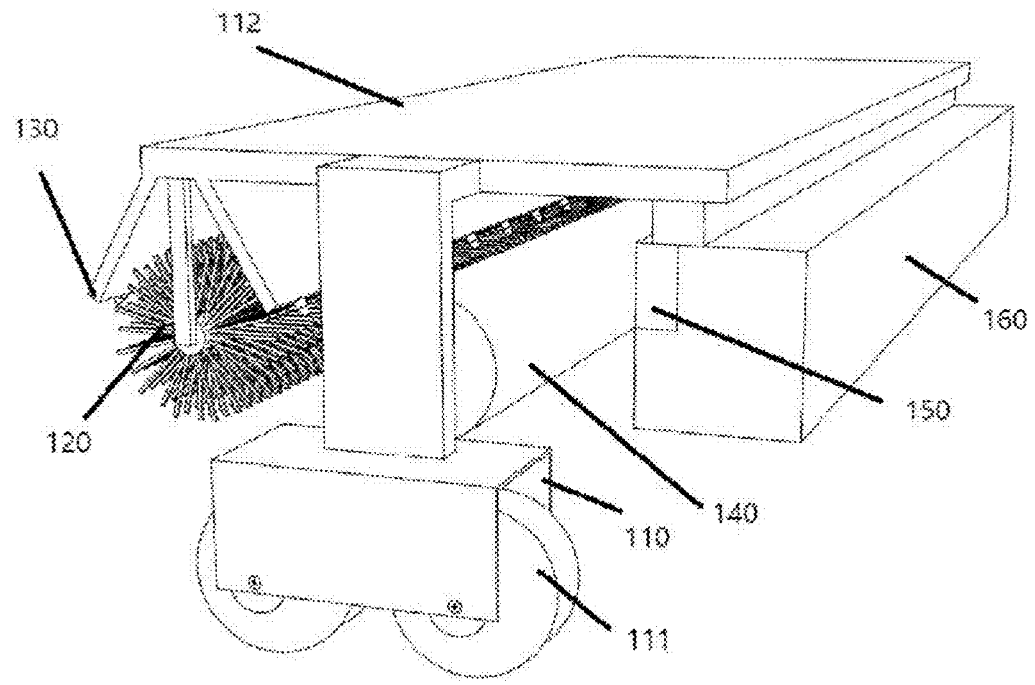
[FIG. 5]
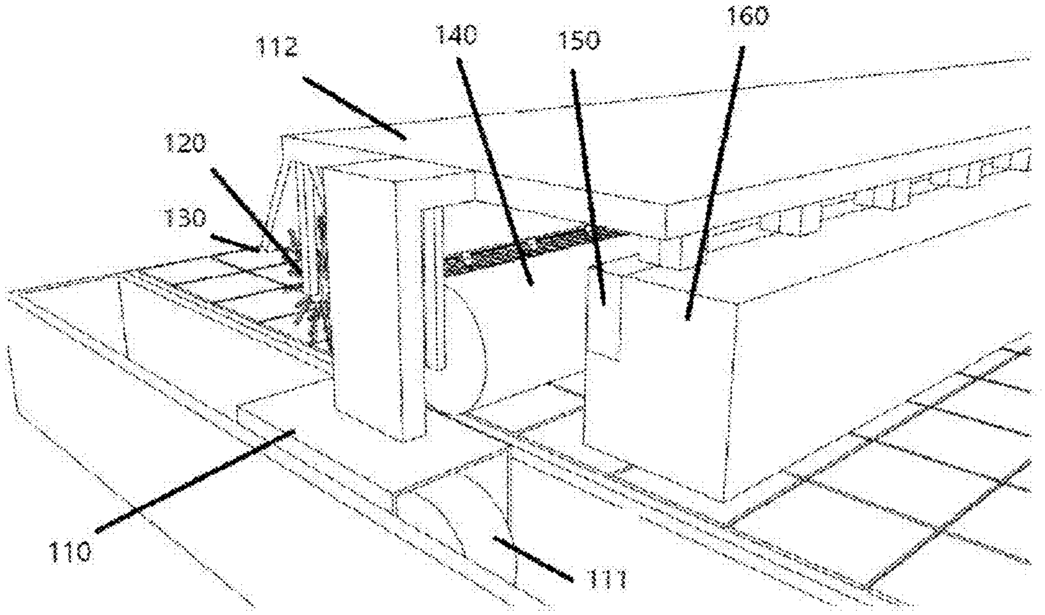

[FIG. 6]
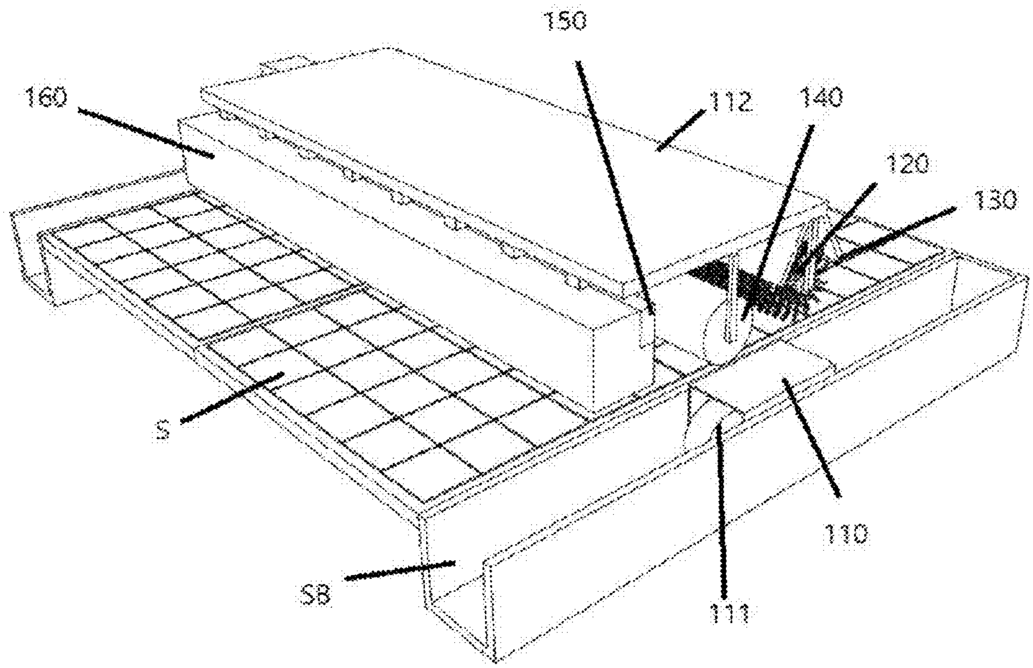
[FIG. 7]
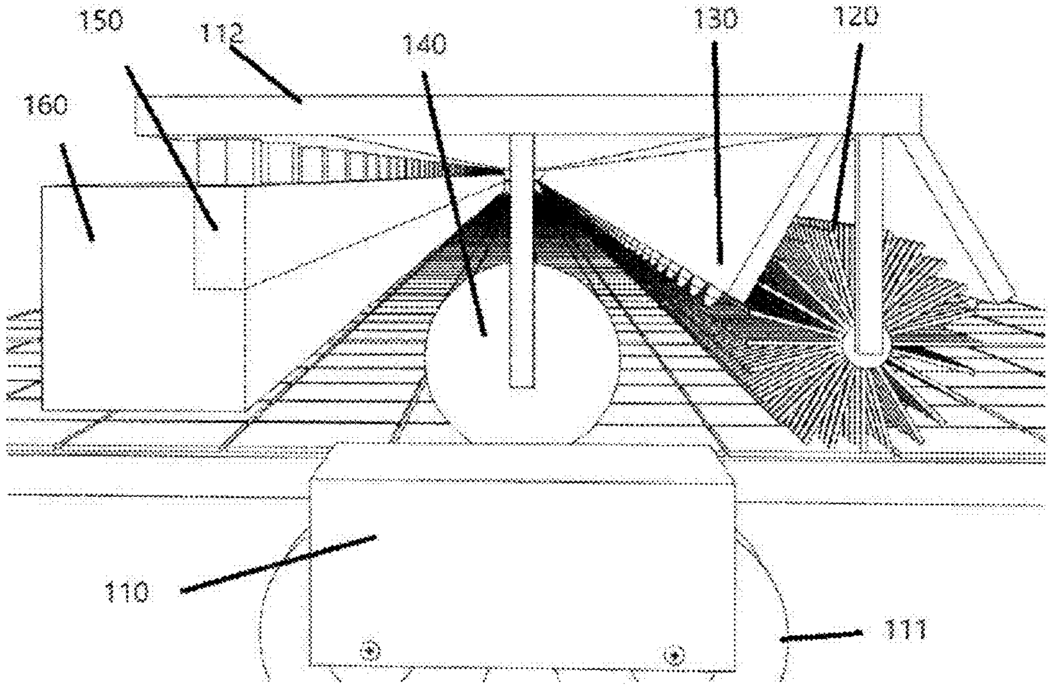

[FIG. 8]
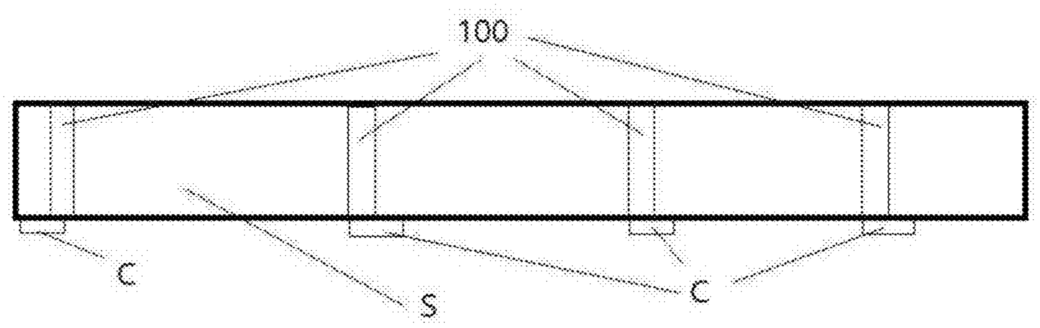
[FIG. 9]
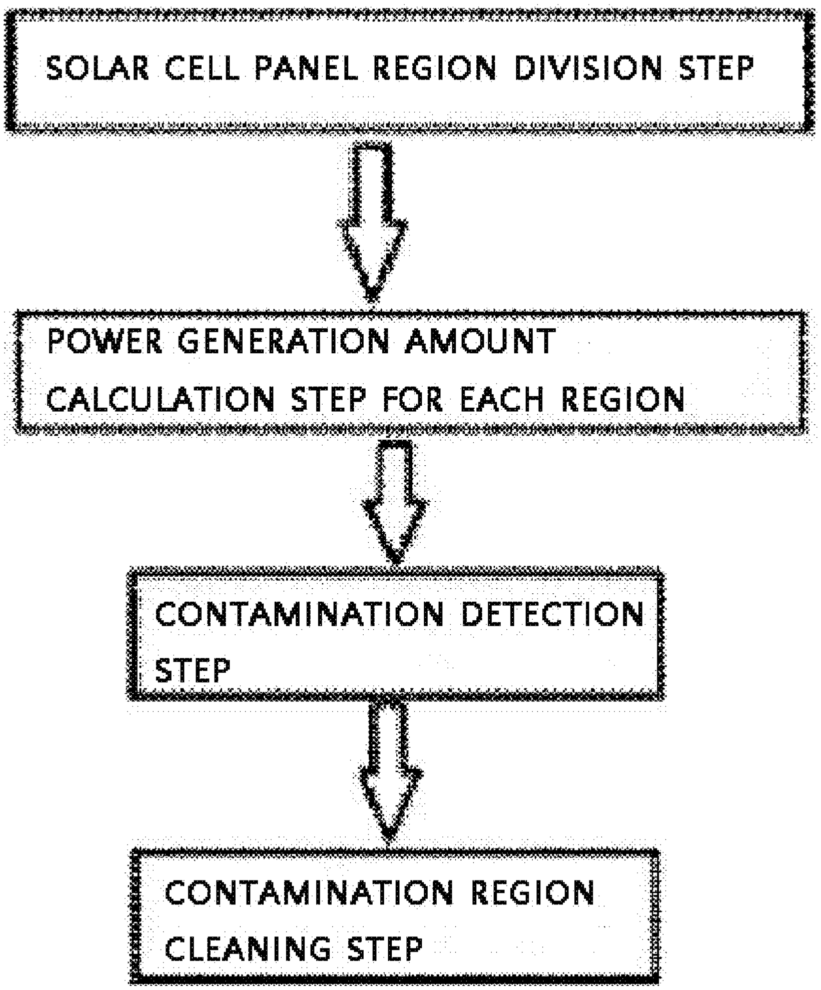

[FIG. 10]
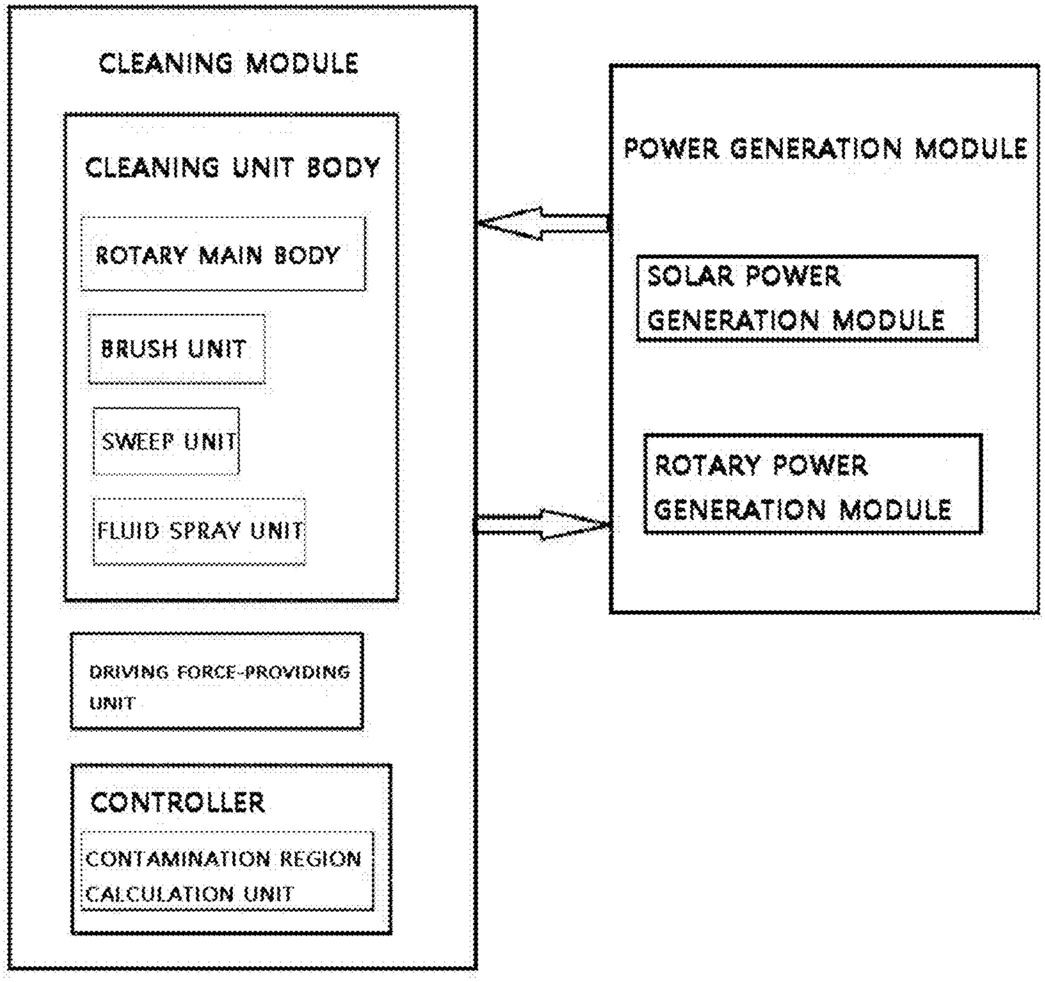

[FIG. 11]
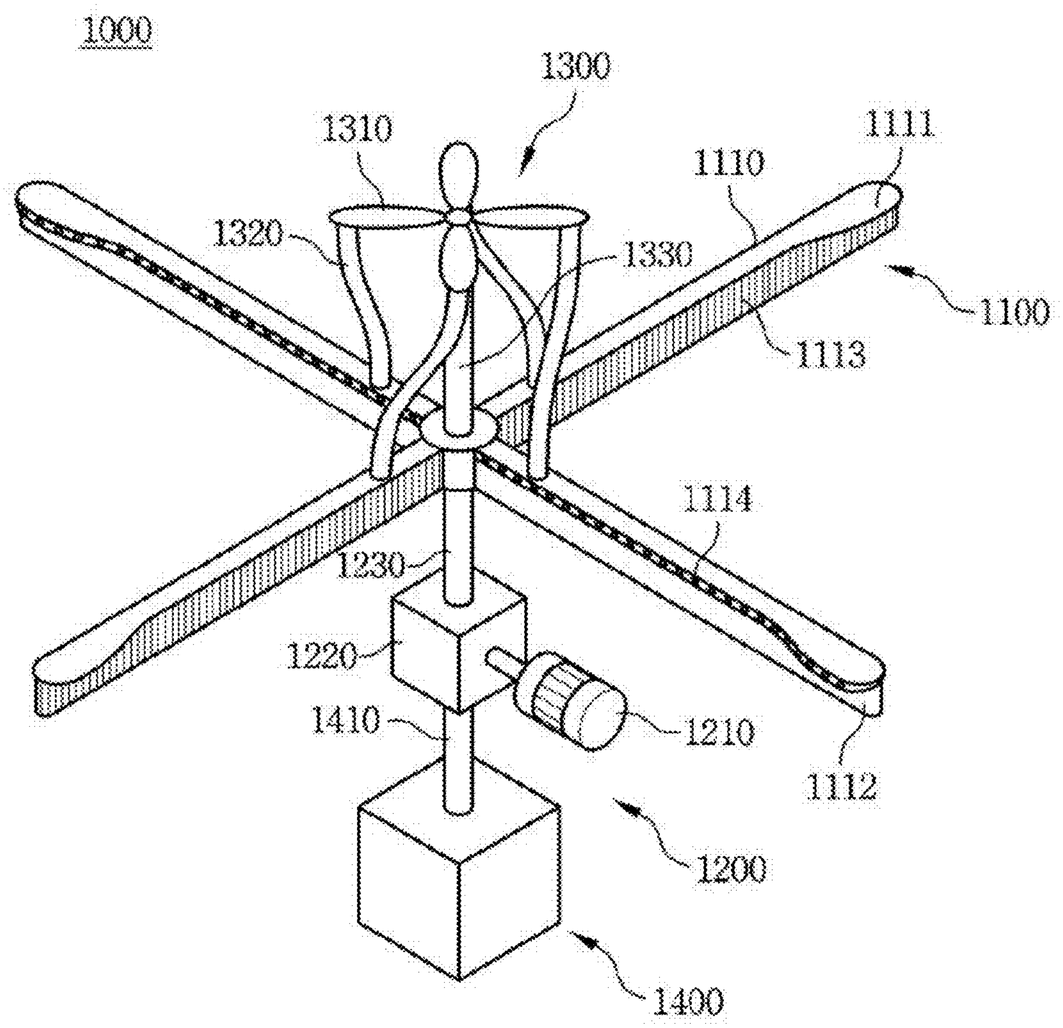

[FIG. 12]
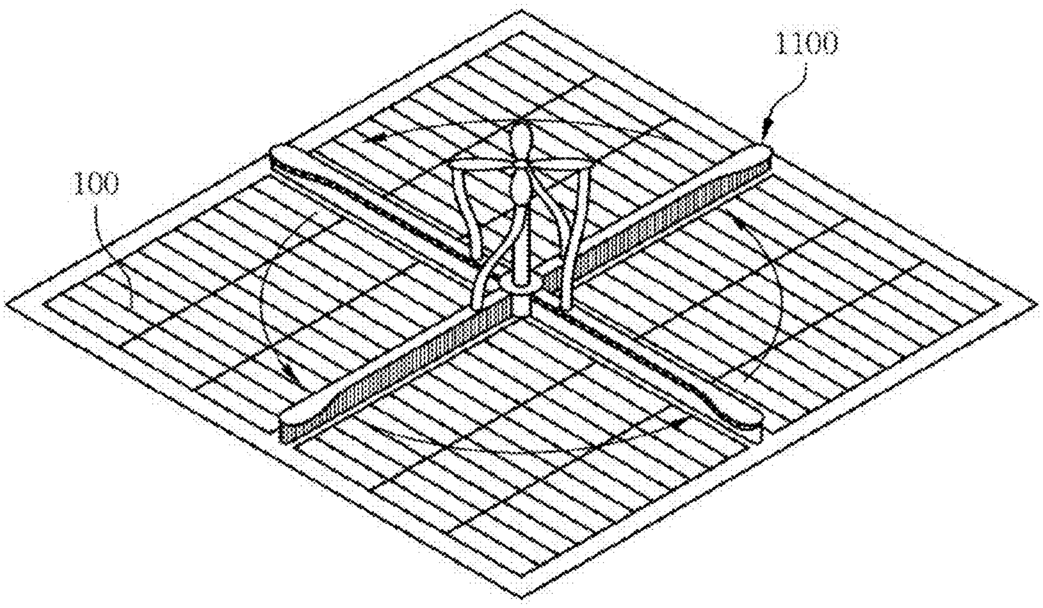

[FIG. 13]
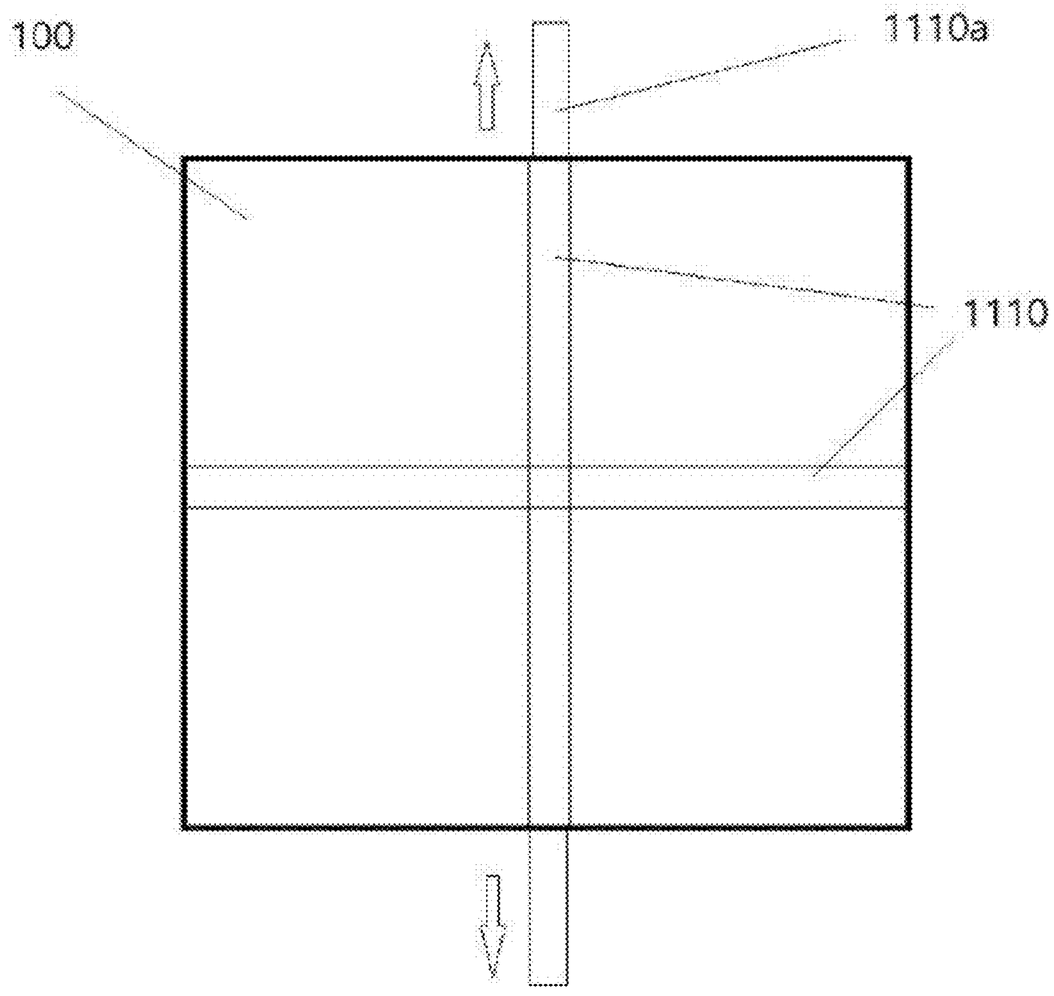

[FIG. 14]
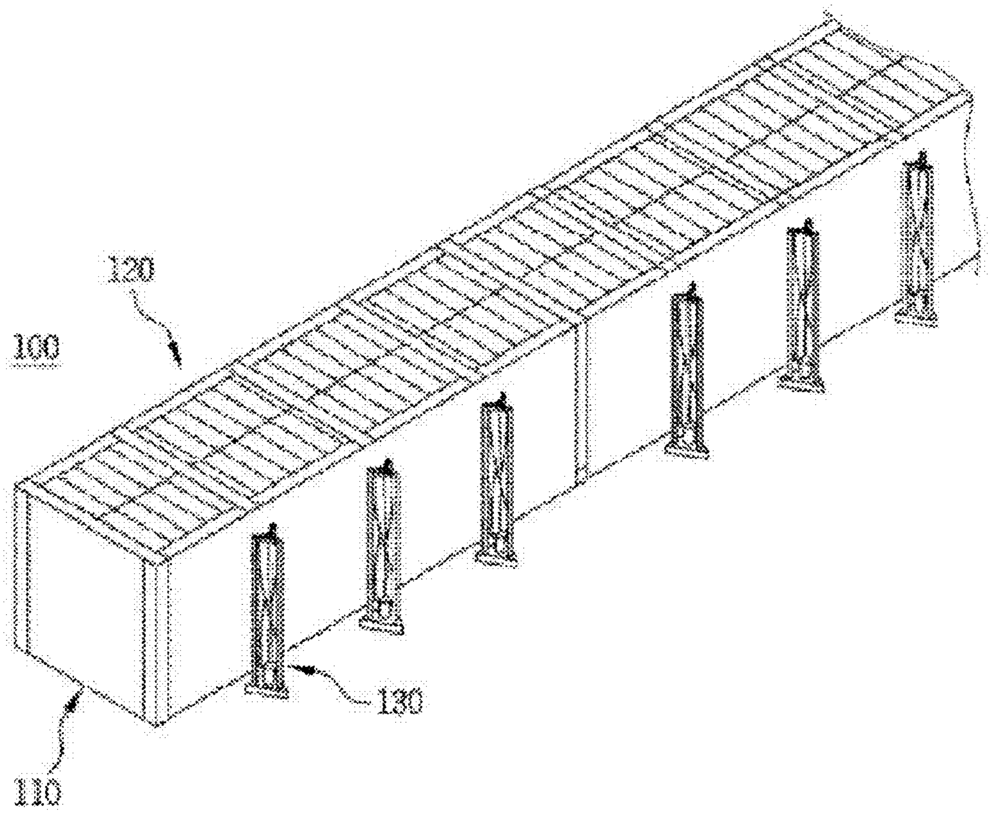

[FIG. 15]
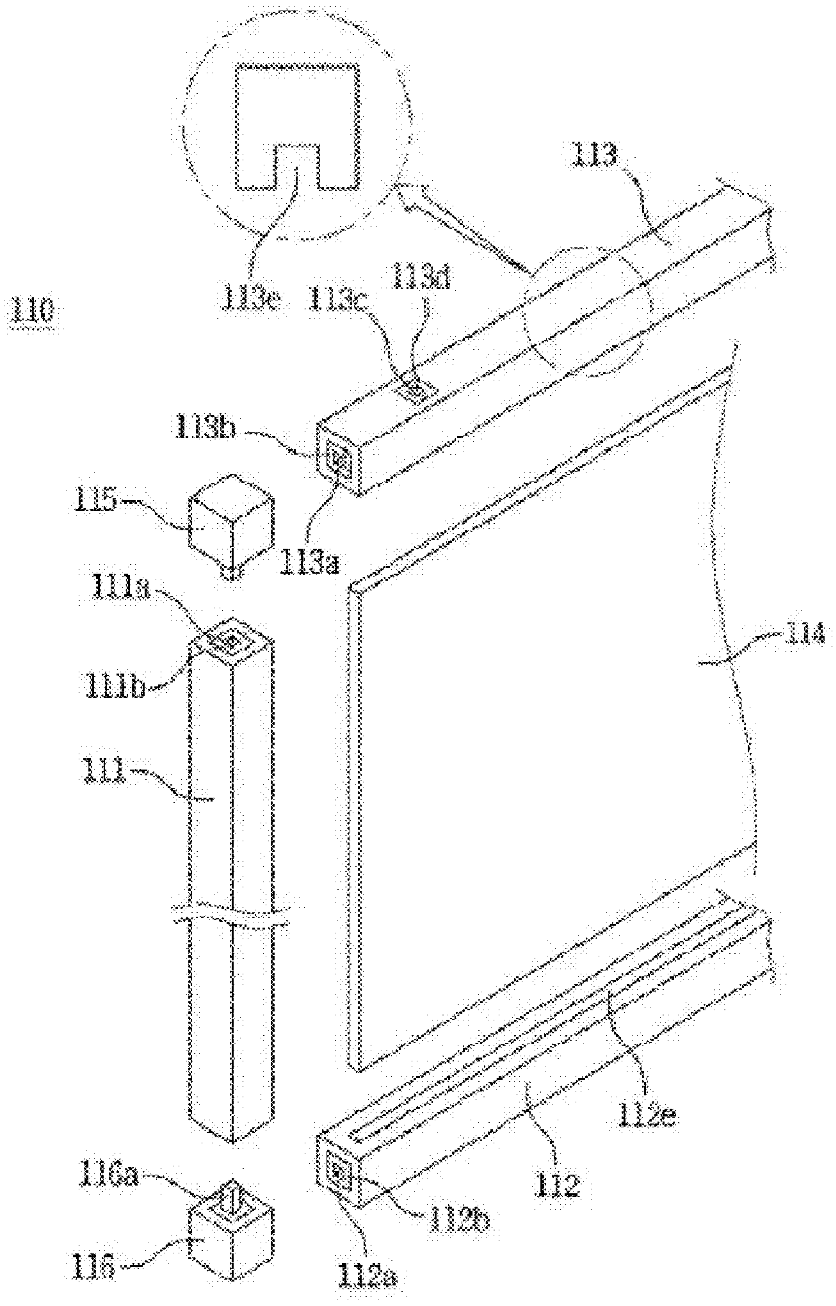

[FIG. 16]
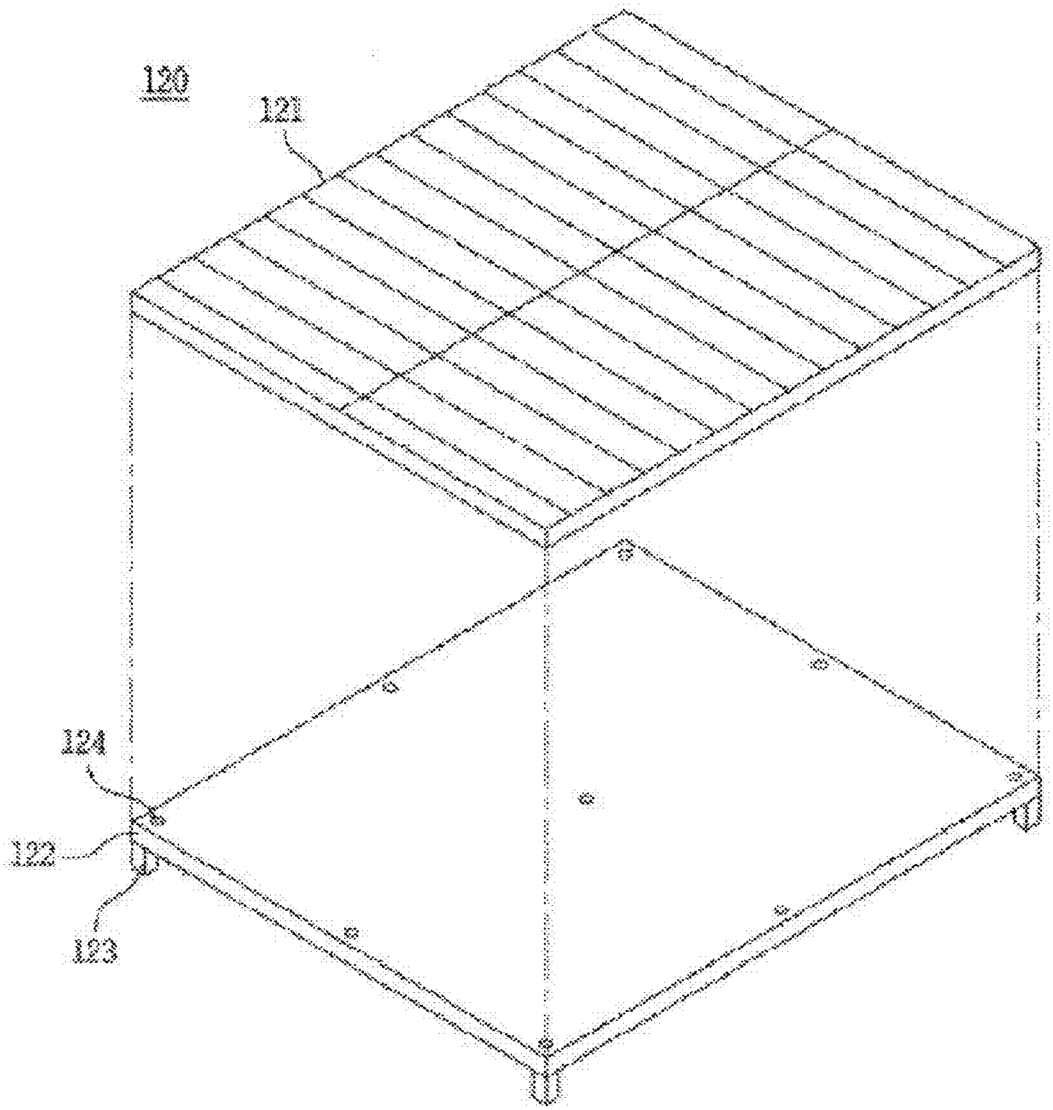

[FIG. 17]
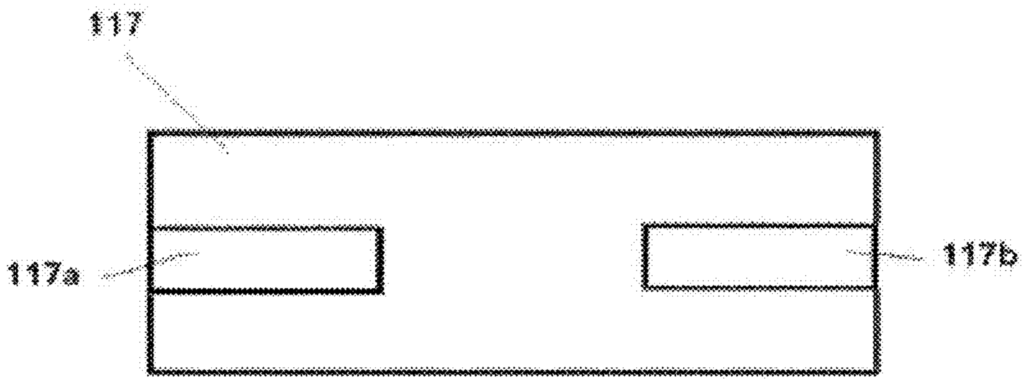
[FIG. 18]
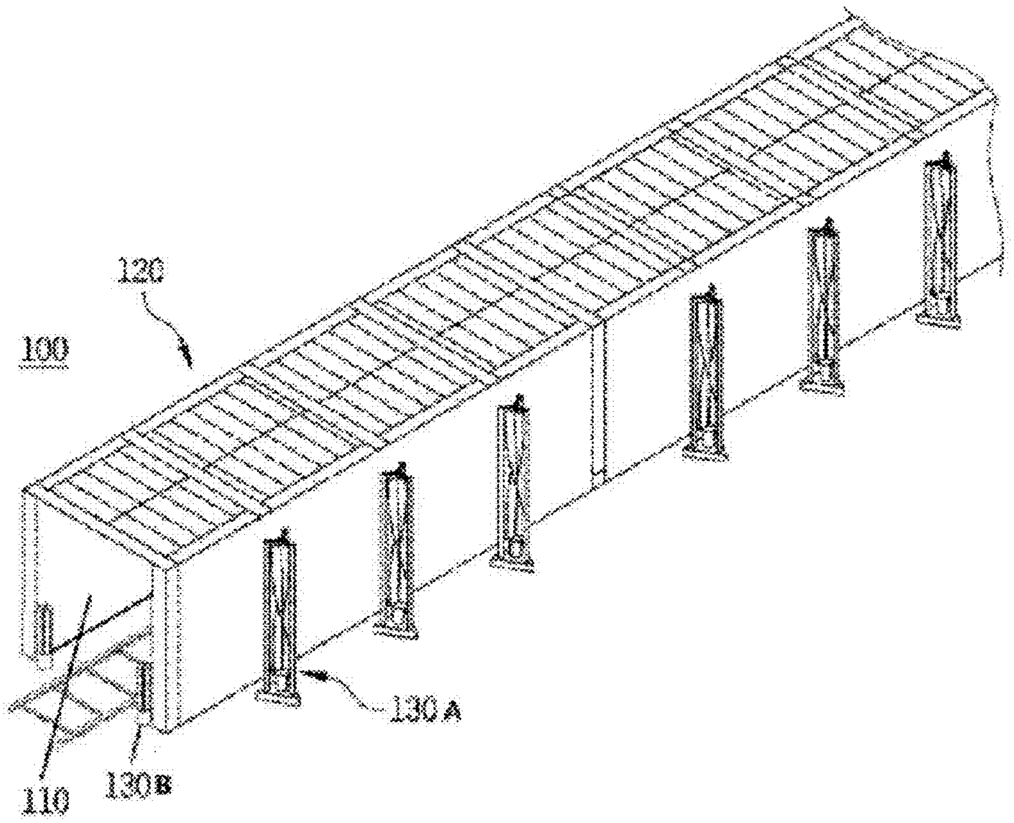

[FIG. 19]
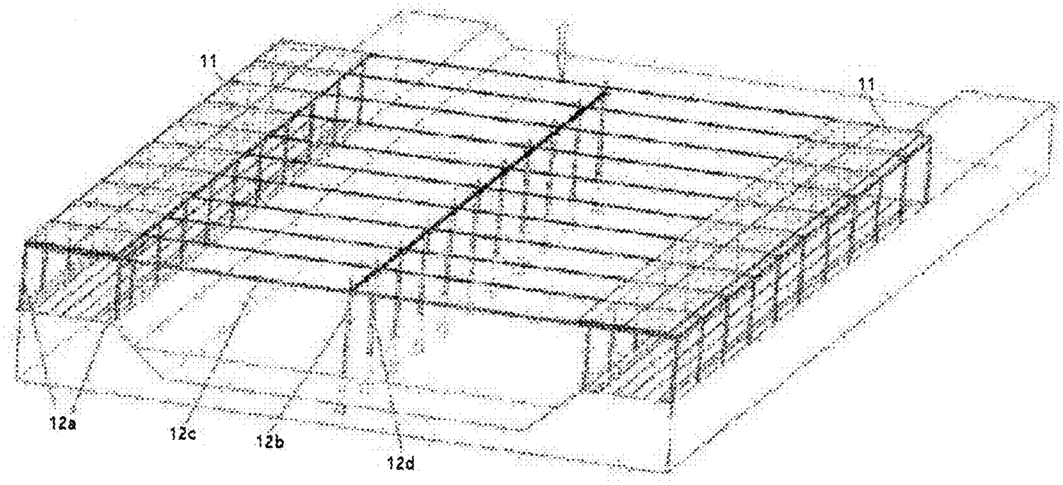
[FIG. 20]
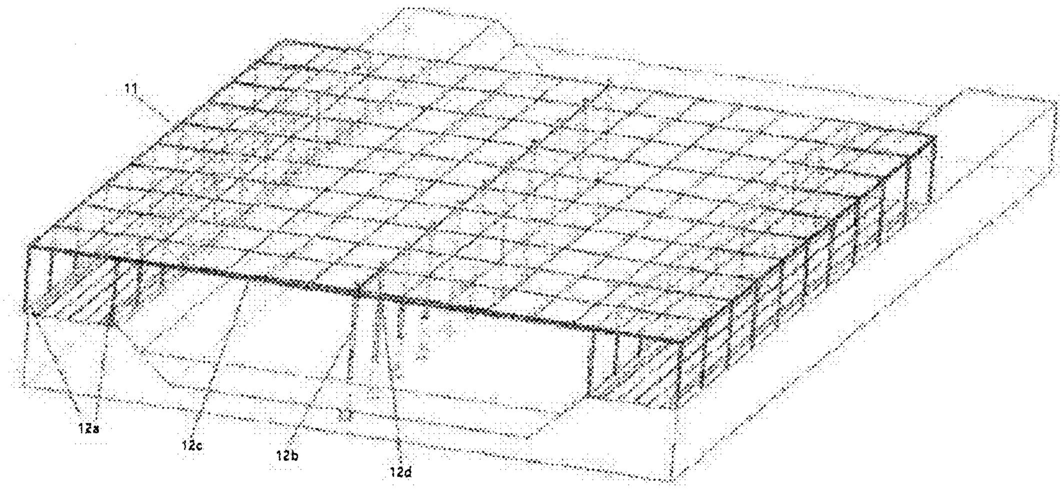

APPARATUS FOR AUTOMATICALLY CLEANING SOLAR CELL PANEL AND SOLAR CELL PANEL CLEANING SYSTEM USING SAME

TECHNICAL FIELD

The present invention relates to a solar cell panel cleaning system and a method for cleaning the solar cell panel using the same.

BACKGROUND ART

Recently, as issues such as depletion of natural resources, and environmental and safety related to thermal and nuclear power generation have been raised, research on solar or wind power as clean energy has been actively performed.

In particular, power generation systems using solar energy have received considerable attention from a vantage point of infinite and clean energy, and are being used in a wide variety of applications, such as residential power generation, street lamps or remote unmanned lighthouses, clock towers and the like. Meanwhile, these solar power generation systems are often installed on the rooftops of buildings where a lot of solar radiation can be obtained, or installed at secluded places with being directly exposed to sunlight, such as hillsides where sunlight can be well secured.

Further, in the case of solar cell panels, in order to increase power generation efficiency, the solar cell panels are mounted over a wide range and are used as a fixed type.

However, the solar cell panels of the prior art are the fixed type, and when the solar cell panels are contaminated by foreign substances, there is a problem in that the power generation efficiency of the solar cell panels is reduced.

In addition, the conventional solar cell panels cleaning apparatuses have problems in that it is difficult to effectively clean the panels and it is impossible to effectively clean the panels over a large area in real time.

SUMMARY OF INVENTION

Problems to be Solved by Invention

An object of the present invention is to provide a self-mobile type automatic cleaning solar cell panel structure which can identify contaminated regions in a large area of the solar cell panel and automatically clean the contaminated regions.

Another object of the present invention is to provide an apparatus for automatically cleaning a solar cell panel including a power generation module, which can identify contaminated regions in a large area of the solar cell panel and automatically clean the contaminated regions, and a solar cell panel cleaning and power generation system using the same, as well as a method for generating electricity and cleaning a solar cell panel using the same.

Means for Solving Problems

According to an aspect of the present invention, there is provided a solar cell panel cleaning system including: a cleaning unit body configured to remove foreign substances attached to the solar cell panel; a driving force-providing unit configured to move the cleaning unit body; and a controller including a contamination region calculation unit configured to sense a contaminated region of the solar cell panel, and a wireless communication module configured to provide information on the contaminated region to the driving force-providing unit and the cleaning unit body.

According to another aspect of the present invention, there is provided an apparatus for automatically cleaning a solar cell panel including: a main body movably mounted on the solar cell panel; a fluid spray unit including nozzles configured to spray fluid on the solar cell panel and coupled to the main body; a brush unit located in the rear of the fluid spray unit based on a moving direction of the main body and coupled to the main body; and a sweep unit configured to remove the fluid or foreign substances remaining on the solar cell panel after spraying through the fluid spray unit.

In addition, according to another aspect of the present invention, there are provided an apparatus for automatically cleaning a solar cell panel including: a cleaning module which includes a cleaning unit body including a rotary main body and a brush unit, and a driving force-providing unit configured to provide a driving force to rotate the cleaning unit body; and a power generation module which includes a solar power generation module and is configured to supply electric power to the cleaning module, as well as a solar cell panel cleaning and power generation system using the same.

Advantageous Effects

According to the present invention, it is possible to obtain a self-mobile type automatic cleaning solar cell panel structure which can identify contaminated regions in a large area of the solar cell panel and automatically clean the contaminated regions.

BRIEF DESCRIPTION OF DRAWINGS

FIG. 1 is a block diagram schematically illustrating the configuration of an automatic solar cell panel cleaning system according to the technical idea of the present invention.

FIG. 2 is a view illustrating the schematic configuration of an apparatus for automatically cleaning a solar cell panel ("an automatic solar cell panel cleaning apparatus") of a first embodiment for implementing the automatic solar cell panel cleaning system according to the present invention.

FIG. 3 is a view schematically illustrating the configuration of a fluid spray unit in the automatic solar cell panel cleaning apparatus shown in FIG. 2.

FIG. 4 is a perspective view illustrating the schematic configuration of an automatic solar cell panel cleaning apparatus of a second embodiment for implementing the automatic solar cell panel cleaning system according to the present invention.

FIGS. 5 to 7 are views illustrating the schematic use state of the automatic solar cell panel cleaning apparatus shown in FIG. 4.

FIG. 8 is a view illustrating a first schematic use state of the automatic solar cell panel cleaning system according to the present invention.

FIG. 9 is a flow chart schematically illustrating procedures of a cleaning method using the automatic solar cell panel cleaning system according to the present invention.

FIG. 10 is a block diagram schematically illustrating the configuration of another automatic solar cell panel cleaning system according to the technical idea of the present invention.

FIG. 11 is a perspective view illustrating the schematic configuration of an automatic solar cell panel cleaning apparatus according to an embodiment of the automatic solar cell panel cleaning system shown in FIG. 10.

FIG. 12 is a view illustrating the schematic use state of the automatic solar cell panel cleaning apparatus shown in FIG. 11.

FIG. 13 is a plan view illustrating the schematic configuration of an automatic solar cell panel cleaning apparatus according to another embodiment of the automatic solar cell panel cleaning system shown in FIG. 10.

FIG. 14 is a perspective view schematically illustrating a structure of an embodiment of the present invention, to which the automatic solar cell panel cleaning apparatus according to an embodiment of the present invention is applied.

FIG. 15 is a partially exploded perspective view schematically illustrating the configuration of an embodiment in which an artificial tunnel structure shown in FIG. 14 is implemented.

FIG. 16 is a perspective view schematically illustrating the configuration of an upper plate in the artificial tunnel structure shown in FIG. 14.

FIG. 17 is a view schematically illustrating the configuration of a side plate connection part in the artificial tunnel structure shown in FIG. 14.

FIG. 18 is a perspective view schematically illustrating a structure of another embodiment to which the automatic solar cell panel cleaning apparatus according to an embodiment of the present invention is applied.

FIG. 19 is a perspective view schematically illustrating a structure of another embodiment to which the automatic solar cell panel cleaning apparatus according to an embodiment of the present invention is applied.

FIG. 20 is a perspective view schematically illustrating the use state of the solar cell panel shown in FIG. 19.

MODE FOR CARRYING OUT INVENTION

Accordingly, persons having common knowledge in the technical field to which the present invention pertains may easily implement the invention based on the technical spirit thereof. In description of the present invention, the publicly known techniques related to the present invention, which are verified to be able to make the purport of the present invention unnecessarily obscure, will not be described in detail. Hereinafter, preferred embodiments according to the present invention will be described in detail with reference to the accompanying drawings. In the drawings, the same reference numerals are used to indicate the same or similar components.

Hereinafter, a configuration in which an component is disposed at an "upper (or lower) portion" or "on (or under)" of another component means that the component is placed in contact with an upper (or lower) surface of the other component, as well as, that another component may be interposed between the other component and the component disposed on (or under) the other component.

Further, it will be understood that when a component is described to as being "connected," "coupled" or "coupled" to another component, the component may be directly connected or coupled the other component, but another component may be "interposed" between the respective components, or the component may be "connected," "coupled" or "coupled" to the other component through another component.

Hereinafter, preferred embodiments of the present invention will be described in detail with reference to the accompanying drawings.

FIG. 1 is a block diagram schematically illustrating the configuration of an automatic solar cell panel cleaning system according to the technical idea of the present invention.

As shown in FIG. 1, the solar cell panel cleaning system includes a cleaning unit body, a driving force-providing unit and a controller.

The cleaning unit body includes a fluid spray unit, a brush unit and a sweep unit.

The fluid spray unit, the brush unit, and the sweep unit are located sequentially in a moving direction of the cleaning unit body. That is, the fluid spray unit is located on a front, the brush unit is located next to the same, and the sweep unit is located next to the same.

The fluid spray unit sprays fluid on the solar cell panel to remove foreign substances attached to the solar cell panel. To this end, the fluid spray unit may spray cleaning water or air, and may include a spray pump for supplying the fluid.

The brush unit is configured to remove foreign substances which are not removed by the fluid spray unit, and includes a brush and a rotating device coupled thereto.

The sweep unit is configured to remove the fluid or foreign substances remaining on the solar cell panel after spraying through the fluid spray unit. To this end, the sweep unit includes a sweeper and a pivoting device coupled to the sweeper.

The driving force-providing unit is configured to move the cleaning unit body, and may include a motor for providing a driving force.

The controller includes a contamination region calculation unit configured to sense contaminated regions of the solar cell panel and a wireless communication module.

In addition, the solar cell panel of the solar power generation device is divided into a plurality of regions, and includes a power generation amount detection unit. The power generation amount detection unit detects power generation amounts for each region of the solar cell panel in real time, and the wireless communication module of the solar power generation device transmits information on the contaminated region to the controller using the power generation amount detection information.

The contamination region calculation unit of the controller is configured to calculate a contamination level in a specific region of the solar cell panel through the power generation amount detection information of the solar power generation device, and may include a light quantity sensor or a power generation amount detection sensor.

That is, if the power generation amount of a region is small out of an error range by comparing with that of the region adjacent thereto, the contamination region calculation unit determines that the region is contaminated.

The wireless communication module of the controller transmits information on the contaminated region of the solar cell panel to the driving force-providing unit and the cleaning unit body.

In addition, the solar cell panel cleaning system according to an embodiment of the present invention further includes a rechargeable battery unit. The rechargeable battery unit supplies electric power to the driving force-providing unit, the controller and the cleaning unit body, respectively.

Further, the solar cell panel cleaning system according to an embodiment of the present invention may further include a fluid tank for storing fluid to be supplied to the fluid spray unit.

Furthermore, the cleaning unit body may include a suction unit instead of the fluid spray unit.

In addition, the cleaning unit body further includes a camera module. Thus, after cleaning the contaminated region, the degree of cleaning may be determined by capturing an image of the contaminated region using the camera module. According to information on the captured image, if contaminants remain even after the cleaning unit body has passed, the cleaning unit body may move back to the contaminated region and perform a cleaning operation once again.

FIG. 2 is a view illustrating the schematic configuration of the automatic solar cell panel cleaning apparatus of a first embodiment for implementing the automatic solar cell panel cleaning system according to the present invention, and FIG. 3 is a view schematically illustrating the configuration of a fluid spray unit in the automatic solar cell panel cleaning apparatus shown in FIG. 2.

As shown in FIGS. 2 and 3, the automatic solar cell panel cleaning apparatus includes a main body 10, a brush unit 20, a fluid spray unit 30 and a sweep unit 40.

More specifically, the brush unit 20, the fluid spray unit 30, and the sweep unit 40 are coupled to the main body 10, and the main body 10 is movably mounted on the solar cell panel.

In addition, the main body 10 further includes a driving device (not shown) that provides a driving force to the apparatus to move it on the solar cell panel. The driving device includes a motor and a drive gear, and a driven gear corresponding to the drive gear of the driving device is formed in the solar cell panel. As the motor rotates, the main body 10 may move along the solar cell panel.

The fluid spray unit 30 is located in the front of the brush unit 20 in the moving direction of the main body 10. In addition, the brush unit 20 is configured to remove foreign substances which are not removed by the fluid spray unit 30.

The brush unit 20 includes a brush and a rotating device, and the rotating device is connected with the brush to rotate the brush.

The fluid spray unit 30 is configured to spray fluid on the solar cell panel, and includes spray bodies 31*a* and 31*b* and nozzles. In addition, the spray bodies 31*a* and 31*b* are located on both sides of the brush unit 20, respectively, and fluid transfer pipes (not shown) for supplying fluid to the nozzles 32 are installed inside the spray bodies 31*a* and 31*b*, respectively. Accordingly, the nozzles 32 receives fluid from a fluid reservoir through a pump and spray the fluid to the front of the brush.

The sweep unit 40 is configured to remove the fluid or foreign substances remaining on the solar cell panel after spraying through the fluid spray unit.

To this end, the sweep unit 40 includes a pivot body 41, a sweeper 42 and pivot supports 43. The pivot body 41 is pivotably coupled to the main body 10. Further, when the main body 10 reciprocates to clean the solar cell panel, the pivot body is pivoted to be located in the rear of the brush unit 20. To this end, the sweep unit 40 includes a pivot device (not shown) that pivots the pivot supports 43.

The sweeper 42 includes a sheet 42*a*, a frame 42*b* and an attaching and detaching member 42*c*. The sheet 42*a* is detachably coupled to the frame 42*b* by the attaching and detaching member 42*c*.

One end of the pivot support 43 is coupled to the sweeper 42, and the other end of the pivot support 43 is coupled to the main body 10.

In addition, the sweepers may be located on both sides based on the moving direction of the main body 10 about the brush unit 20.

Further, the automatic solar cell panel cleaning apparatus includes a wireless communication module, receives information on the contaminated region through the communication module from an outside, and moves to the region to perform a cleaning process.

FIG. 4 is a perspective view illustrating the schematic configuration of an automatic solar cell panel cleaning apparatus of a second embodiment for implementing the automatic solar cell panel cleaning system according to the present invention, and FIGS. 5 to 7 are views illustrating the schematic use state of the automatic solar cell panel cleaning apparatus shown in FIG. 4.

As shown in FIGS. 4 to 7, the automatic solar cell panel cleaning apparatus includes a main body 110, a brush unit 120, fluid spray units 130, a sweep unit 140, a battery unit 150 and a fluid tank 160.

More specifically, the brush unit 120, the fluid spray units 130, and the sweep unit 140 are coupled to the main body 110, and the main body 110 is movably mounted on the solar cell panel.

In addition, the main body 110 further includes a driving device (not shown) which provides a driving force to move the cleaning apparatus on the solar cell panel. The driving device includes a motor and wheels 111, and wheel frames SB corresponding to the wheels 111 are formed on both sides of the solar cell panel. As the motor rotates, the wheels 111 may rotate to be moved along the wheel frames SB of the main body 110.

The fluid spray units 130 are located in the front and rear of the brush unit 120 in the moving direction of the main body 110. In addition, the brush unit 120 is configured to remove foreign substances which are not removed by the fluid spray unit 130.

The brush unit 120 includes a brush and a rotating device. The brush is formed in a cylindrical shape as a whole, and the rotating device is connected with the brush to rotate the brush.

The fluid spray unit 130 is configured to spray fluid on the solar cell panel, and includes nozzles. In addition, the nozzles are located on both sides of the brush unit 120, and fluid transfer pipes (not shown) for supplying fluid to the nozzles are installed inside the fluid spray unit 130. Therefore, the nozzles receive fluid from the fluid reservoir through a pump, then spray the fluid to the front and rear of the brush.

The sweep unit 140 is configured to remove the fluid or foreign substances remaining on the solar cell panel after spraying through the fluid spray unit. To this end, the sweep unit 140 is mounted on the main body 110, and includes a rotation motor and a sweeper. The sweeper may be formed in a cylindrical shape as a whole. The sweeper is connected to the rotation motor and may be rotated by the rotation motor to sweep the solar cell panel.

The battery unit 150 is configured to provide electric power to the brush unit 120, the fluid spray units 130 and the sweep unit 140 to operate the same.

In addition, the battery unit 150 includes a wireless charging module, and may receive an electrical energy generated from the solar cell panel.

The fluid tank 160 stores the fluid to be supplied to the fluid spray unit 130. That is, water or cleaning water for the solar cell panel may be stored in the fluid tank 160.

As described above, by including the battery unit 150 and the fluid tank 160, it is possible to clean the solar cell panel while moving thereon independently without a power supply line or a fluid supply pipe when cleaning a large area of the solar cell panel.

FIG. 8 is a view illustrating a first schematic use state of the automatic solar cell panel cleaning system according to the present invention.

As shown in FIG. 8, when a solar cell panel S is formed with a large area, a plurality of automatic solar cell panel cleaning apparatuses 100 may be movably mounted on the solar cell panel with being spaced apart from each other at a predetermined interval.

In addition, when the contaminated region of the solar cell panel is identified by the contamination region calculation unit, the automatic solar cell panel cleaning apparatus 100 closest to the contaminated region is moved to perform a cleaning process.

Therefore, contamination on the large area of solar cell panel S is determined in real time and may perform the cleaning process in the contaminated region.

FIG. 9 is a flow chart schematically illustrating procedures of a cleaning method using the automatic solar cell panel cleaning system according to the present invention.

As shown in FIG. 9, the cleaning method using the self-mobile type automatic cleaning solar cell panel structure includes a solar cell panel region division step, a power generation amount calculation step for each region, a contamination detection step, and a contamination region cleaning step.

The solar cell panel region division step is a step of dividing the solar cell panel into a plurality of regions.

The power generation amount calculation step for each region is a step of calculating a power generation amount in the plurality of divided regions in real time.

The contamination detection step is a step of detecting contamination in real time based on the power generation amount in the plurality of divided regions. That is, if the power generation amount of a region is small out of an error range by comparing with that of the region adjacent thereto, the contamination region calculation unit determines that the region is contaminated.

In the contamination region cleaning step, the automatic solar cell panel cleaning apparatus moves to the contaminated region to clean the contaminated region.

In addition, when solar cell panels are formed over several kilometers, the automatic solar cell panel cleaning apparatuses are movably mounted at a predetermined interval.

Further, when a contaminated region is identified through the contamination detection step, the automatic solar cell panel cleaning apparatus adjacent to the contaminated region moves to perform the cleaning process.

In addition, information on the contaminated region is transmitted to the automatic solar cell panel cleaning apparatus in real time through the wireless communication module, and the main body of the automatic solar cell panel cleaning apparatus moves to the contaminated region. Then, the fluid spray unit sprays fluid, and the rotating device of the brush unit rotates the brush to remove the fluid or foreign substances remaining on the solar cell panel after spraying through the fluid spray unit.

Accordingly, not only it possible to clean the contaminated regions in real time, but also it is possible to obtain uniform power generation amount at all times by effectively cleaning a large area of the solar cell panel.

FIG. 10 is a block diagram schematically illustrating the configuration of another automatic solar cell panel cleaning system according to the technical idea of the present invention.

As shown in FIG. 10, a solar cell panel cleaning and power generation system includes a cleaning module and a power generation module.

More specifically, the cleaning module is configured to clean the solar cell panel, and includes a cleaning unit body, a driving force-providing unit and a controller.

The cleaning unit body includes a rotary main body and a brush unit. The cleaning unit body may further include a fluid spray unit for spraying fluid on the solar cell panel, and a sweep unit.

The rotary main body is rotatably located on an upper portion of the solar cell panel.

The brush unit is configured to remove foreign substances from the solar cell panel, and is coupled to the rotary main body to clean the solar cell panel according to the rotation of the rotary main body.

The sweep unit is configured to remove the fluid and foreign substances remaining on the solar cell panel after spraying.

The fluid spray unit sprays fluid on the solar cell panel to remove foreign substances attached to the solar cell panel. To this end, the fluid spray unit may spray cleaning water or air, and may include a spray pump for supplying the fluid.

The brush unit is configured to remove foreign substances and may be formed of a rubber material in a plate shape.

The sweep unit is configured to remove the fluid or foreign substances remaining on the solar cell panel after spraying through the fluid spray unit.

The driving force-providing unit is configured to provide a driving force to rotate the cleaning unit body, and may include a motor.

The power generation module includes a solar power generation module and a rotary power generation module.

The solar power generation module includes the solar cell panel, and the electrical energy generated from the solar cell panel is provided to the cleaning module.

The rotary power generation module is connected to the rotary main body of the cleaning module, and generates electricity by rotation of the rotary main body. To this end, the power generation module may include technical configurations of the power generation unit of the wind power generator known in the art.

Accordingly, the driving force-providing unit rotates the cleaning unit body to clean the solar cell panel, and the power generation module generates electricity according to the rotation of the cleaning unit body.

The controller includes a contamination region calculation unit which senses the contaminated region of the solar cell panel.

In addition, the solar cell panel is divided into a plurality of regions, and the contamination region calculation unit determines the contaminated region using information on the power generation amount or light quantity for each region of the solar cell panel.

To this end, the contamination region calculation unit of the controller is configured to calculate and determine the contamination of a specific region of the solar cell panel based on the power generation amount detection information of the solar power generation device, and may include a light quantity sensor or a power generation amount detection unit.

That is, if the power generation amount of a region is small out of an error range by comparing with that of the region adjacent thereto, the contamination region calculation unit determines that the region is contaminated.

The controller may further include a wireless communication module. The controller may receive external weather and environmental information through the wireless communication module, and control to operate the driving force-providing unit using the received information.

Further, the solar cell panel cleaning system according to an embodiment of the present invention may further include a fluid tank for storing fluid to be supplied to the fluid spray unit.

Furthermore, the cleaning unit body may include a suction unit instead of the fluid spray unit.

In addition, the cleaning unit body further includes a camera module. Thus, after cleaning the contaminated region, the degree of cleaning may be determined by capturing an image of the contaminated region using the camera module. According to information on the captured image, if contaminants remain even after the cleaning unit body has passed, the cleaning unit body may move back to the contaminated region and perform a cleaning operation once again.

In addition, it is possible to prevent birds from landing on the solar cell panel due to the rotation of the rotary main body.

Further, the rotary main body may be equipped with a light emitting unit such as an LED module and a warning sound generator, thereby chasing away the birds or implementing as a display device.

FIG. 11 is a perspective view illustrating the schematic configuration of an automatic solar cell panel cleaning apparatus according to an embodiment of the automatic solar cell panel cleaning system shown in FIG. 10.

As shown in FIG. 11, an automatic solar cell panel cleaning apparatus 1000 including a power generation module includes a cleaning unit body 1100, a driving force-providing unit 1200, and a power generation unit 1400. In addition, the automatic solar cell panel cleaning apparatus 1000 including a power generation module may further include a propeller 1300 for wind power generation connected to the power generation unit 1400.

More specifically, the cleaning unit body 1100 includes a rotary main body 1110 in which a plurality of radially extending bars are coupled. FIG. 11 shows a rotary main body 1110 in which four bars are coupled, but it is not limited thereto, and may be implemented as a main body in which two or three bars are coupled.

The rotary main body 1110 includes a weight part 1111 formed at one end thereof. A brush unit 1112 and a sweep unit 1113 extending vertically toward the solar cell panel are coupled to a lower portion of the rotary main body 1110.

The weight part 1111 serves to provide an inertial force when the cleaning unit body 1100 is rotated. That is, when the rotational force applied to the cleaning unit body 1100 stops, the cleaning unit body 1100 continues to rotate due to the centrifugal force of the weight part 1111.

The brush unit 1112 and the sweep unit 1113 may be alternately arranged in the rotation direction of the rotary main body 1110.

The cleaning unit body 1100 has fluid spray orifices 1114 configured to spray fluid toward the solar cell panel. In addition, the automatic solar cell panel cleaning apparatus 1000 further includes a fluid supply unit (not shown) for supplying cleaning water or air to the fluid spray orifices 1114.

The cleaning unit body 1100 further includes a camera module. Thus, after cleaning the contaminated region, the degree of cleaning may be determined by capturing an image of the contaminated region using the camera module. According to information on the captured image, if contaminants remain even after the cleaning unit body has passed, the main body moves back to the contaminated region and performs a cleaning operation once again.

The propeller 1300 for wind power generation is connected to an upper portion of the cleaning unit body 1100 so as to be erected.

The propeller 1300 for wind power generation includes a horizontal body 1310, vertical wings 1320, and a supporting bar 1330. The supporting bar may be connected to the upper central portion of the cleaning unit body 1100 so as to be erected. The vertical wing 1320 serves to provide a rotational force by the wind, of which one end is connected to the horizontal body and the other end is connected to the rotary main body 1110. In addition, the vertical wing 1320 is formed in a plate shape and has a curved surface to provide a rotational force by the wind.

The driving force-providing unit 1200 is configured to rotate the cleaning unit body 1100. To this end, the driving force-providing unit 1200 includes a motor 1210, a bevel gear set 1220 and a connecting bar 1230.

The motor 1210 provides a rotational force to rotate the connecting bar 1230 through the bevel gear set 1220. The connecting bar 1230 is connected to the rotary main body 1110.

A drive bar 1410 of the power generation unit 1400 is connected to the connecting bar 1230, and rotated by the connecting bar 1230. The power generation unit 1400 generates electricity by rotation of the drive bar 1410 and may be implemented as a power generation unit of a wind power generator.

FIG. 12 is a view illustrating the schematic use state of the automatic solar cell panel cleaning apparatus shown in FIG. 11.

As shown in FIG. 12, the automatic solar cell panel cleaning apparatus 1000 including the power generation module is mounted on the solar cell panel 100.

More specifically, the cleaning unit body 1100 is located at the upper portion of the solar cell panel 100, and the driving force-providing unit 1200 and the power generation unit 1400 are located at the lower portion of the solar cell panel 100.

In addition, the brush unit 1112 and the sweep unit 1113 of the cleaning unit body 1100 are located in contact with the solar cell panel 100. The fluid spray orifices 1114 of the cleaning unit body 1100 are formed in the rotary main body 1110 so as to spray fluid toward the solar cell panel.

When the rotary main body 1110 is rotated through the driving force-providing unit 1200 configured as described above, the brush unit 1112 and the sweep unit 1113 clean the solar cell panel.

In addition, the fluid spray orifices 1114 of the rotary main body 1110 spray cleaning water toward the solar cell panel. Accordingly, the cleaning power of the solar cell panel is improved, and the cleaning water remaining on the solar cell panel is removed by the sweep unit 1113, thereby preventing a decrease in the power generation amount.

Next, after cleaning the contaminated region, the camera module captures an image of the contaminated region to determine the degree of cleaning. If it is determined that contaminants remain even after the main body has passed based on information on the captured image, the cleaning unit body rotates on the contaminated region and perform a cleaning operation once again.

When the rotary main body 1110 is rotated, the drive bar 1410 of the power generation unit is rotated by the connecting bar 1230 of the driving force-providing unit, and the power generation unit 1400 generates electricity by the rotational force of the drive bar 1410.

FIG. 13 is a plan view illustrating the schematic configuration of an automatic solar cell panel cleaning apparatus according to another embodiment of the automatic solar cell panel cleaning system shown in FIG. 10.

As shown in FIG. 13, the rotary main body 1110 further includes auxiliary bodies 1110*a*. The auxiliary body 1110*a* is configured to additionally clean a black region B of the solar cell panel that cannot be cleaned through the rotary main body 1110.

In addition, the auxiliary bodies 1110*a* may be retractably coupled to both ends of the rotary main body 1110.

In addition, the auxiliary bodies 1110*a* may be coupled to both ends of the rotary main body 1110 to be rotated together.

FIG. 14 is a perspective view schematically illustrating a structure of an embodiment of the present invention, to which the automatic solar cell panel cleaning apparatus according to an embodiment of the present invention is applied.

As shown in FIG. 14, a convergence power generation system 100 using solar and wind power includes an artificial tunnel structure 110, a solar power generation module 120, a wind power generation module, an artificial tunnel electric device (not shown), a power storage unit (not shown) and a controller (not shown).

In addition, the above-described automatic solar cell panel cleaning apparatus is mounted on the upper portion of the solar cell panel of the solar power generation module mounted on the artificial tunnel structure 110.

More specifically, the artificial tunnel structure 110 is constructed on a road. In addition, the solar power generation module 120 may be mounted on the artificial tunnel structure 110, and a wind power generation module 130 may be mounted on the artificial tunnel structure 110 or outside the artificial tunnel structure 110.

In addition, as shown in FIG. 18, wind power generation modules 130A and 130B may be installed on both sides of the artificial tunnel structure 110, respectively.

In general, the artificial tunnel structure 110 is installed on a terrain that is not subject to solar interference, such that as much sunlight as possible may be introduced.

The wind power generation module may include a first wind power generation module (not shown) and a second wind power generation module 130.

The first wind power generation module is configured to generate electricity using wind flowing by the vehicles traveling inside the artificial tunnel structure 110.

The second wind power generation module is configured to generate electricity using natural wind flowing in the vicinity of the artificial tunnel structure 110. In addition, the second wind power generation module 130 includes a rotation detection sensor (not shown) for detecting the rotation of the blade and a rotating device (not shown).

The controller is connected to the solar power generation module 120, the wind power generation module 130 and a vehicle artificial tunnel electric device (not shown), and controls them so that the electricity generated from the solar power generation module 120 and the wind power generation module 130 is transmitted to a power storage unit or an artificial tunnel electric device (not shown).

The artificial tunnel electrical device (not shown) includes a display device, an air purifier, a reverse entry detection sensor, a reverse entry blocking unit and the like.

The air purifier may be formed in a square or cylindrical shape.

In addition, as the air purifier is formed to extend in a traveling direction of the vehicles in the artificial tunnel, air purifying efficiency is improved.

The reverse entry detection sensor detects the reverse entry of the vehicle, and when the reverse entry blocking unit detects the reverse entry, operates the blocking bar to block the vehicle from entering in the reverse direction.

In addition, the controller includes a wind speed sensor and a wired or wireless communication module to operate the rotating device of the second wind power generation module 130, and receives information on the rotation status of the blade in real time through the rotation detection sensor of the blade to rotate the blade selectively based on the received information.

FIG. 15 is a partially exploded perspective view schematically illustrating the configuration of an embodiment in which an artificial tunnel structure shown in FIG. 14 is implemented.

FIG. 16 is a perspective view schematically illustrating the configuration of an upper plate in the artificial tunnel structure shown in FIG. 14.

FIG. 17 is a view schematically illustrating the configuration of a side plate connection part in the artificial tunnel structure shown in FIG. 14.

As shown in FIGS. 15 to 17, a prefabricated artificial tunnel including a self-power generation system includes a tunnel structure 110 and a solar power generation unit 120. The solar power generation unit 120 is coupled to an upper portion of the tunnel structure 110.

The above-described automatic solar cell panel cleaning apparatus is mounted on the solar cell panel of the solar power generation unit.

In addition, the wind power generation unit 130 may be mounted on the tunnel structure 110 or installed around the tunnel structure 110.

More specifically, the tunnel structure may be formed in an integrated shape or prefabricated type. In the case of forming in the prefabricated type, the tunnel structure 110 includes a column 111, a lower frame 112, an upper frame 113, a side wall 114, a first connection member 115 and a second connection member 116.

A first connection member 115 and a second connection member 116 are coupled to the upper and lower portions of the column 111, respectively.

To this end, an upper coupler 11la and an upper buffer 111*b* are formed at an upper end of the column 111, and a lower coupler (not shown) and an upper buffer (not shown) are formed at a lower end of the column 111.

The lower coupler (not shown) and the lower buffer (not shown) are coupled with the second connection member 116, and may have the same configuration as the upper coupler 11la and the upper buffer 111*b*, respectively.

The upper coupler 11la may be formed in an insertion groove shape, and the upper buffer 111*b* is coupled to the outer periphery of the upper coupler 111*a*.

The upper buffer 111*b* is a damping structure and may be made of a buffer material such as rubber.

The first connection member 115 and the second connection member 116 respectively include column couplers 115*a* and 116*a* formed on lower and upper surfaces thereof to be coupled with the column, and frame couplers (not shown) formed on side faces thereof to be coupled with the upper frame 113 and the lower frame 112.

The column couplers 115*a* and 116*a* may be formed as protrusions corresponding to the upper coupler 111*a* and the lower coupler formed as insertion grooves, and base coupler (not shown) may be formed in the same shape as the column couplers 115*a* and 116*a*.

The upper frame 113 is coupled to the upper end of the side wall 114, and coupled to the column 111 by the first connection member 115. In addition, the solar power generation unit 120 is mounted on the upper portion of the upper frame 113.

To this end, the upper frame 113 has a column coupler 113*a* and a column buffer 113*b* formed in a side face thereof. The column coupler 113*a* is formed to correspond to the frame coupler of the first connection member.

In addition, the column coupler 113*a* may be formed in an insertion groove shape, and the column buffer 113*b* is coupled to the outer periphery of the column coupler 113*a*.

The column buffer 113*b* is a damping structure and may be made of a buffer material such as rubber.

In addition, the upper frame 113 has a power generation unit coupler 113*c* and a power generation unit buffer 113*d* formed in an upper surface thereof in order to mount the solar power generation unit 120 thereon. Further, the power generation unit coupler 113*c* and the power generation unit buffer 113*d* may be formed in the same shape while having the same function as the column coupler 113*a* and the column buffer 113*b*.

The upper frame 113 has a side wall recess (not shown, corresponding to numeral 112*e* below) formed in a lower surface thereof, into which the side wall 114 is inserted. The sidewall recess may be formed in a groove shape, and a buffer (not shown) may be further formed outside the sidewall recess.

The lower frame 112 may be formed in the same shape as the upper frame 113, except that only the power generation unit coupler 113*c* and the power generation unit buffer 113*d* are not formed.

That is, the lower frame 112 has a column coupler 112*a* and a column buffer 112*b* formed in a side face thereof. The column coupler 112*a* is formed to correspond to the frame coupler of the second connection member 116.

In addition, the column coupler 112*a* may be formed in an insertion groove shape, and the column buffer 112*b* is coupled to the outer periphery of the column coupler 112*a*.

The column buffer 112*b* is a damping structure and may be made of a buffer material such as rubber.

The lower frame 112 has a side wall recess 112*e* formed in an upper surface thereof, into which the side wall 114 is inserted.

In addition, the sidewall recess 112*e* may be formed in a groove shape, and a buffer (not shown) may be further formed around the sidewall recess 112*e*.

The side wall 114 is inserted into the side wall recesses 112*e* of the upper frame and the lower frame. In addition, a side wall recess may be further formed in the column 111, and the side wall may be inserted into the side wall recess of the column.

In addition, the tunnel structure 110 of the prefabricated artificial tunnel including the self-power generation system further includes a connecting column 117. This column is intended to form one tunnel structure by connecting the side walls when the tunnel structure 110 is formed in a large scale.

That is, when the tunnel structure 110 is constructed from hundreds of meters to several kilometers, the side walls are connected to both sides of the connecting column 117.

To this end, the connecting column 117 has side wall couplers 117*a* and $\mathbf{117}_b$ formed on both sides thereof.

In addition, the connecting column 117 may have an upper coupler, an upper buffer, a lower coupler and a lower buffer, which are formed in the same shape as those of the column 111.

The solar power generation unit 120 includes a solar cell panel 121 and an upper plate 122. In this case, the solar cell panel 121 is coupled to the upper plate 122, and the upper plate 122 is coupled to the upper frame 113.

To this end, a solar cell panel coupler 124 is formed in the upper plate 122, and an upper plate coupler (not shown) corresponding to the solar cell panel coupler 124 is formed on the solar cell panel 121.

The solar cell panel coupler 124 may be formed in the shape of a groove, and the upper plate coupler may be formed in the shape of a protrusion to be inserted into the groove.

A buffer may be formed in the solar cell panel coupler 124.

The upper plate 122 has frame couplers 123 corresponding to the power generation unit couplers 113*c* formed on lower corners thereof. In addition, a gap is formed between the solar cell panel 121 and the upper plate 122, and cooling fans (not shown) may be installed in the gap.

The cooling fan is configured to flow air between the solar cell panel 121 and the upper plate 122. The temperature of the solar cell panel 121 is decreased through the air flow caused by the cooling fan, thereby improving the power generation efficiency of the solar power generation unit 120.

FIG. 18 is a perspective view schematically illustrating a structure of another embodiment to which the automatic solar cell panel cleaning apparatus according to an embodiment of the present invention is applied.

As shown in FIG. 18, a convergence power generation system 100 using solar and wind power installed on a railway includes an artificial tunnel structure 110, a solar power generation module 120, wind power generation modules 130A and 130B, and an artificial tunnel electric device (not shown), a power storage unit (not shown) and a controller (not shown).

More specifically, the artificial tunnel structure 110 is constructed on the railway. That is, the artificial tunnel structure 110 is formed as a tunnel structure in which the railway extends inside.

In addition, the solar power generation module 120 is mounted on the artificial tunnel structure 110, and the wind power generation modules 130A and 130B may be installed inside the artificial tunnel structure 110 or outside the artificial tunnel structure 110. The above-described automatic solar cell panel cleaning apparatus is mounted on the solar power generation module of the solar cell panel.

Further, the wind power generation modules 130B installed inside the artificial tunnel structure 110 may be installed on both sides of the railway, and the wind power generation modules 130A installed outside the artificial tunnel structure 110 may be installed on both sides of the artificial tunnel structure 110.

In general, since the railway is installed on flat ground without obstacles, as much sunlight as possible may be introduced into the artificial tunnel structure 110.

As described above, the wind power generation module may include a first wind power generation module 130A installed outside the artificial tunnel structure and a second wind power generation module 130B installed inside the artificial tunnel structure and located on both sides of the railway.

The first wind power generation module 130A is configured to generate electricity using natural wind flowing near the artificial tunnel structure 110.

The second wind power generation module 130B is configured to generate electricity using the wind flowing by the train traveling inside the artificial tunnel structure 110.

In addition, the first and second wind power generation modules 130A and 130B include a rotation detection sensor (not shown) and a rotating device (not shown) for detecting the rotation of the blade, respectively.

The controller is connected to the solar power generation module 120, the wind power generation modules 130A and 130B, and the railway artificial tunnel electric device 140, and controls them so that the electricity generated by the solar power generation module 120 and the wind power generation modules 130A and 130B is transmitted to the power storage unit or the railway artificial tunnel electric device (not shown).

The artificial tunnel electrical device (not shown) includes a display device, an air purifier, a detection sensor, a fluid supply device and the like.

The air purifier may be formed in a square or cylindrical shape.

In addition, the air purifier is formed to extend in a traveling direction of the train in the artificial tunnel structure, thereby improving air purification efficiency.

The fluid supply device is configured to supply fluid into the artificial tunnel structure, and may provide fluid for fire and quarantine. The detailed technical configuration for this will be described below.

In addition, the controller includes a wind speed sensor and a wired or wireless communication module to operate the rotating device of the wind power generation modules 130A and 130B, and receives information on the rotation status of the blade in real time through the rotation detection sensor of the blade to rotate the blade selectively based on the received information.

FIG. 19 is a perspective view schematically illustrating a structure of another embodiment to which the automatic solar cell panel cleaning apparatus according to an embodiment of the present invention is applied.

FIG. 20 is a perspective view schematically illustrating the use state of the solar cell panel shown in FIG. 19.

As shown in FIGS. 19 and 20, a river solar power generation system 10 includes a solar power generation unit 11 and a support unit 12.

More specifically, the solar power generation unit includes a plurality of solar cell panels 11.

In addition, the plurality of solar cell panels are coupled so that the plurality of solar cell panels slide and move to fold and unfold. The above-described automatic solar cell panel cleaning apparatus is mounted on the solar power generation unit.

The support unit 12 includes panel supports 12*a* and central supports 12*b*.

The panel supports 12*a* are configured to support the plurality of solar cell panels 11 folded on one side, and the central supports 12*b* are configured to support the solar cell panels at a central portion of the river when the plurality of solar cell panels are unfolded.

In addition, a cylindrical or square air purifier may be installed on the central support 12*b* in an extension direction of the river. Therefore, the support unit may be implemented as one large air purifier.

To this end, the panel supports 12*a* are installed at the riverside of the river, thus a plurality of panel supports may be included.

In addition, the plurality of solar cell panels 11 are supported by the panel supports 12*a* located on the riverside, such that shade is generated by the plurality of solar cell panels 11 on the riverside.

Guide supports 12*c* are placed between the panel support 12*a* and the central support 12*b* to connect them, and the guide supports 12*c* may support the sides of the solar cell panels while guiding them to smoothly move.

To this end, the guide support 12*c* has a groove portion formed therein, by which the solar cell panel is supported.

In addition, the support unit may further include a central connection rod 12*d* for connecting the central supports 12*b* in the longitudinal direction. That is, the central connection rod 12*d* extends in the longitudinal direction of the river.

The plurality of solar cell panels 11 are unfolded by a solar cell panel driving device in a folded state on the panel supports 12*a*, and are unfolded to the central supports 12*b* while being supported by the guide supports 12*c*.

That is, the panel supports 12*a* are located on both sides of the riverside, and the central supports 12*b* are located in the central portion of the river. In this case, the plurality of solar cell panels are moved to selectively unfold from the riverside toward the central portion of the river.

Accordingly, the plurality of solar cell panels may be spread out to cover the river, thus to maximize solar power generation. When natural disasters such as strong winds or typhoons are expected, the panels may be safely kept in the folded state, and by arranging the panels along the river, there are no obstacles preventing sunlight from entering, and thereby maximizing solar power generation.

The central support 12*b* may be equipped with a river purifier and a water sprayer.

In addition, the present invention may be implemented by installing a plurality of solar cell panels so that they are spread out from the central support 12*b* to the panel support 12*a*.

In addition, the automatic solar cell panel cleaning apparatus according to the present invention and the solar cell panel cleaning system using the same may be implemented by being mounted on a bus platform, a barn, a greenhouse structure, a river structure and the like.

As such, embodiments of the present invention have been described with reference to the accompanying drawings, but it should be understood by those skilled in the art that the present invention may be implemented in other specific embodiments without changing the technical idea and essential characteristics of the invention. Accordingly, it should be understood that the above-described embodiments are only intended to illustrate the present invention and are not intended to limit the scope thereof in all aspects.

The invention claimed is:

1. A solar cell panel cleaning system using an automatic solar cell panel cleaning apparatus, the system comprising:

a cleaning unit body configured to remove foreign substances attached to the solar cell panel;

a driving force-providing unit configured to move the cleaning unit body; and a controller including a contamination region calculation unit configured to sense a contaminated region of the solar cell panel, and a wireless communication module configured to provide information on the contaminated region to the driving force-providing unit and the cleaning unit body wherein a power generation module further comprises a rotary power generation module connected to the driving force-providing unit of the cleaning unit body and configured to generate electricity by rotation of the rotary main body.

2. The system according to claim 1, wherein a plurality of automatic solar cell panel cleaning apparatus are movably mounted on the solar cell panel with being spaced apart from each other, and when the contaminated region is identified by the contamination region calculation unit, the controller moves an automatic solar cell panel cleaning apparatus of the plurality of automatic solar cell panel cleaning apparatus closest to the contaminated region to perform a cleaning process.

3. The system according to claim 1, wherein the cleaning unit body comprises:

a fluid spray unit configured to spray fluid on the solar cell panel; a brush unit configured to remove the foreign substances which are not removed by the fluid spray unit; and a sweep unit configured to remove the fluid or foreign substances remaining on the solar cell panel after spraying through the fluid spray unit.

4. An apparatus for automatically cleaning a solar cell panel, the apparatus comprising:

a main body movably mounted on the solar cell panel;

a fluid spray unit including nozzles configured to spray fluid on the solar cell panel and coupled to the main body;

a brush unit located in the rear of the fluid spray unit based on a moving direction of the main body and coupled to the main body; and a sweep unit configured to remove the fluid or foreign substances remaining on the solar cell panel after spraying through the fluid spray unit, wherein a power generation module further comprises a rotary power generation module connected to the main body and configured to generate electricity by rotation of the main body.

5. The apparatus according to claim 4, further comprising a battery unit configured to supply electric power to the main body, the fluid spray unit, the brush unit and the sweep unit.

6. An apparatus for automatically cleaning a solar cell panel, the apparatus comprising:

a cleaning module which comprises a cleaning unit body including a rotary main body and a brush unit, and a driving force-providing unit configured to provide a driving force to rotate the cleaning unit body; and a power generation module which comprises a solar power generation module and is configured to supply electric power to the cleaning module wherein the power generation module further comprises a rotary power generation module connected to the rotary main body of the cleaning module and configured to generate electricity by rotation of the rotary main body.

7. The apparatus according to claim 6, wherein the rotary main body includes a plurality of radially extending bars coupled thereto and a weight part formed at an end thereof, the brush unit is coupled to the rotary main body so as to extend toward the solar cell panel, and fluid spray orifices are formed in the rotary main body to spray cleaning water toward the solar cell panel.

8. A method for generating electricity and cleaning a solar cell panel using the apparatus for automatically cleaning a solar cell panel according to claim 7 which comprises the power generation module, and a solar cell panel cleaning and power generation system using the same, the method comprising:

a solar cell panel region division step of dividing the solar cell panel into a plurality of regions;

a power generation amount calculation step of calculating a power generation amount in the plurality of divided regions in real time;

a contamination detection step of detecting contamination in real time based on the power generation amount in the plurality of divided regions; and a contamination region cleaning step of cleaning the contaminated region by rotating the rotary main body to the contaminated region identified through the contamination detection.

9. The apparatus according to claim 6, further comprising a wind power generation propeller connected to an upper portion of the cleaning unit body so as to be erected.

10. A method for generating electricity and cleaning a solar cell panel using the apparatus for automatically cleaning a solar cell panel according to claim 9 which comprises the power generation module, and a solar cell panel cleaning and power generation system using the same, the method comprising:

a solar cell panel region division step of dividing the solar cell panel into a plurality of regions;

a power generation amount calculation step of calculating a power generation amount in the plurality of divided regions in real time;

a contamination detection step of detecting contamination in real time based on the power generation amount in the plurality of divided regions; and a contamination region cleaning step of cleaning the contaminated region by rotating the rotary main body to the contaminated region identified through the contamination detection.

11. A method for generating electricity and cleaning a solar cell panel using the apparatus for automatically cleaning a solar cell panel according to claim 6 which comprises the power generation module, and a solar cell panel cleaning and power generation system using the same, the method comprising:

a solar cell panel region division step of dividing the solar cell panel into a plurality of regions;

a power generation amount calculation step of calculating a power generation amount in the plurality of divided regions in real time;

a contamination detection step of detecting contamination in real time based on the power generation amount in the plurality of divided regions; and a contamination region cleaning step of cleaning the contaminated region by rotating the rotary main body to the contaminated region identified through the contamination detection.

* * * * *